United States Patent [19]

Tadokoro

[11] Patent Number: 5,224,180
[45] Date of Patent: Jun. 29, 1993

[54] FACSIMILE APPARATUS AND THE METHOD

[75] Inventor: Yoshihisa Tadokoro, Yokohama, Japan

[73] Assignee: Canon Kabushiki Kaisha, Tokyo, Japan

[21] Appl. No.: 709,198

[22] Filed: Jun. 3, 1991

[30] Foreign Application Priority Data

Jun. 5, 1990 [JP] Japan .................................. 2-145466

[51] Int. Cl.$^5$ .................................... G06K 9/00
[52] U.S. Cl. ...................... 382/61; 355/200; 358/434; 358/468
[58] Field of Search ............... 358/434, 436, 438, 468, 358/403, 440; 382/61; 235/375, 376, 454, 470; 355/200, 204

[56] References Cited

U.S. PATENT DOCUMENTS

| | | | |
|---|---|---|---|
| 4,408,181 | 10/1983 | Nakayama | 382/61 |
| 4,686,704 | 8/1987 | Kamada et al. | 382/61 |
| 4,760,606 | 7/1988 | Lesnick et al. | 382/61 |
| 5,010,580 | 4/1991 | Vincent et al. | 382/61 |
| 5,099,340 | 3/1992 | Kamada et al. | 358/434 |
| 5,161,037 | 11/1992 | Saito | 358/468 |

Primary Examiner—David K. Moore
Assistant Examiner—David Fox
Attorney, Agent, or Firm—Fitzpatrick, Cella, Harper & Scinto

[57] ABSTRACT

A facsimile apparatus possesses a function in which the number of output copies of a received document is designated in the form of image data. In order to obtain this function, sheet information, on which character information is disposed in accordance with a predetermined rule, is received along with the document information. The character information of the received sheet information is recognized, and the number of output copies of the received document information is analyzed based upon the recognized character information. The received document information is outputted in accordance with the number of copies determined by analysis.

8 Claims, 5 Drawing Sheets

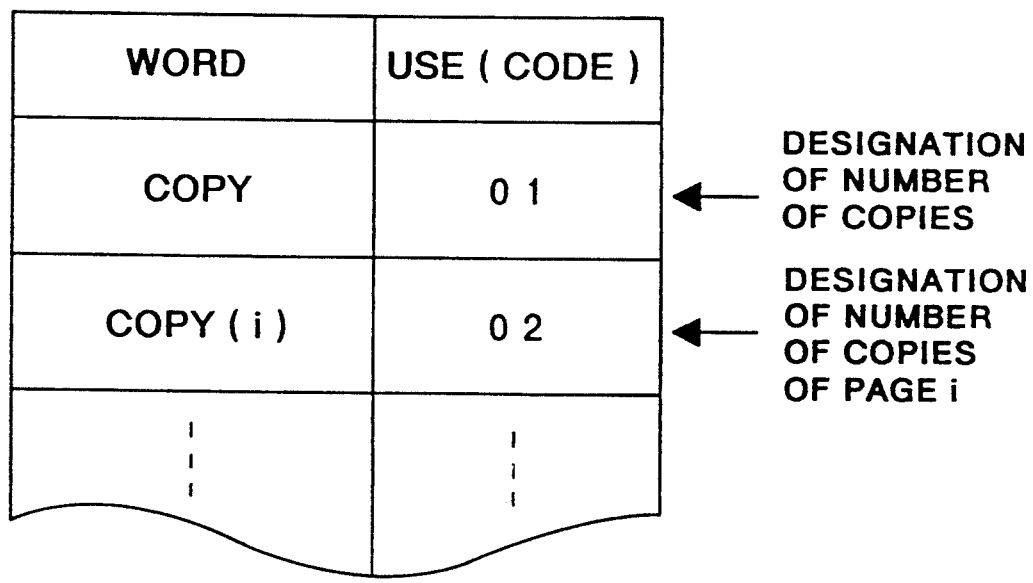
F I G. 5

FACSIMILE APPARATUS AND THE METHOD

BACKGROUND OF THE INVENTION

1. Field of the Invention

This invention relates to a facsimile apparatus and the method capable of sending and receiving image data through a communication line.

2. Description of the Related Art

In a case where a facsimile apparatus on a sending side possesses a function that allows the number of copies to be designated, the conventional practice is for the sending apparatus to instruct the receiving apparatus of the number of copies of a document to be printed out by the receiving apparatus by a communication procedure, whereupon the receiving apparatus print outs the received document in the number of copies designated.

However, if the apparatus on the sending side does not possess the function for designating the number of copies by the communication procedure, the apparatus on the receiving side can output only only one copy of the document.

SUMMARY OF THE INVENTION

An object of the present invention is to provide a facsimile apparatus which solves the foregoing problem.

Another object of the present invention is to provide a facsimile apparatus in which the receiving side is capable of outputting a plurality of copies of a received document even if the number of copies to be printed out on the receiving side is not designated on the sending side at the communication procedure.

Still another object of the present invention is to provide a facsimile apparatus in which the number of output copies of a document can be transmitted as image data using sheet information for an optical character reader.

A further object of the present invention is to provide a facsimile apparatus in which the number of output copies of a designated page of a document can be designated by image data.

According to the present invention, the foregoing objects are attained by providing a facsimile apparatus comprising receiving means for receiving sheet information, on which character information is disposed in accordance with a predetermined rule, and document information, recognizing means for recognizing the character information of the received sheet information, analyzing means for analyzing a method of outputting the received document information based upon the recognized character information, and output means for outputting the received document information in accordance with the analyzed output method.

A further object of the present invention is to provide an image output method for outputting received image data, comprising steps of receiving image data, subjecting the received image data to recognition processing, deciding an output mode of the received image data in accordance with results of the recognition processing obtain from subjecting step and outputting the received image data in accordance with the output mode decided at deciding step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a diagram illustrating a second modification of the embodiment.

DESCRIPTION OF THE PREFERRED EMBODIMENT

A preferred embodiment of the present invention will now be described in detail with reference to the accompanying drawings.

When a document is sent from a facsimile apparatus on the sending side to a facsimile apparatus on the receiving side, the present embodiment employs a method in which the number of copies of the received document to be printed out on the receiving side is transmitted by the image of an OCR (optical character reader) sheet.

Description of Construction

Figure 1:
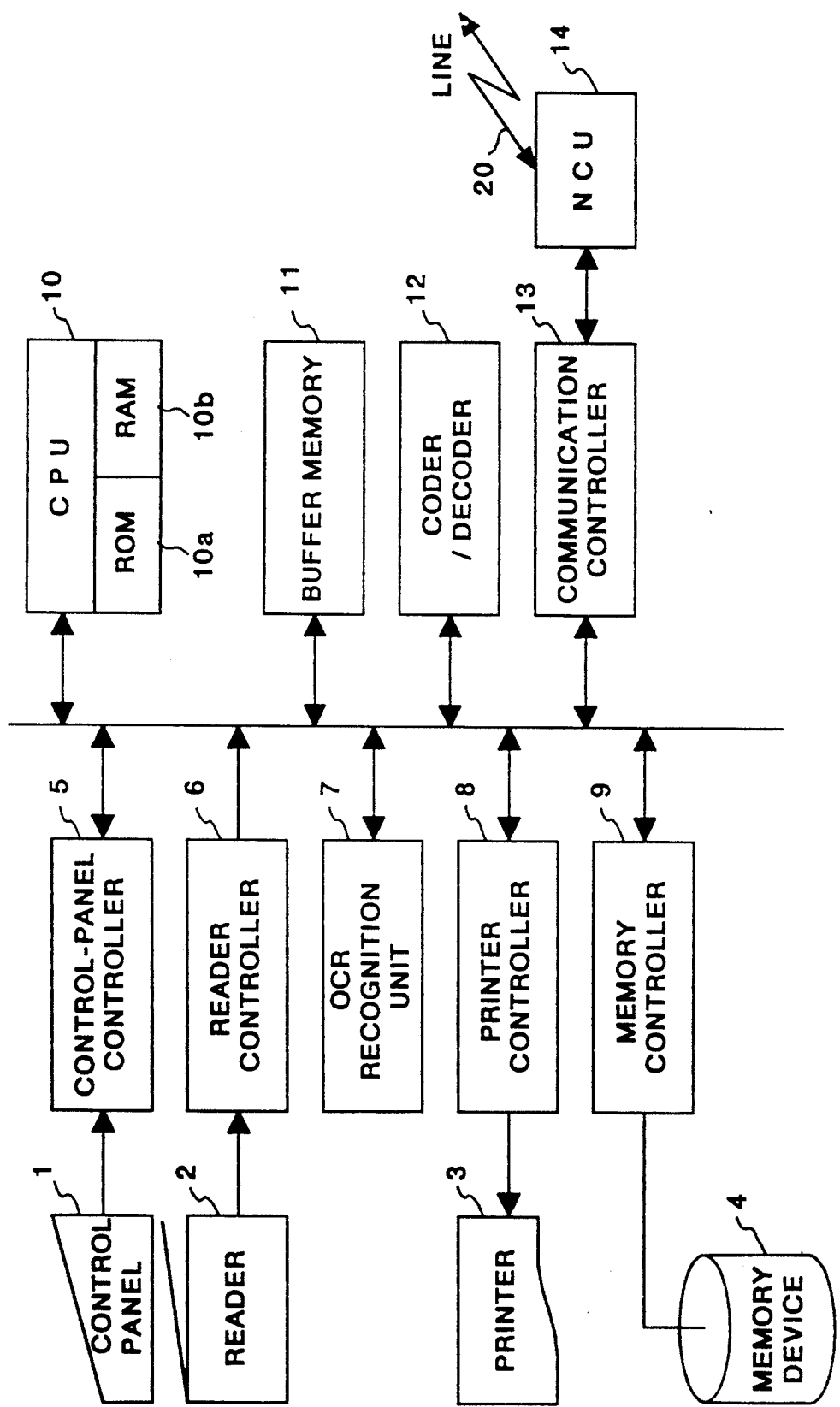
FIG. 1 is a block diagram illustrating the construction of an embodiment of a facsimile apparatus according to the present invention.

FIG. 1 is a block diagram illustrating the construction of an embodiment of a facsimile apparatus according to the present invention. The apparatus includes a control panel 1 having keys for designating modes such as a transmission mode and copy mode, for entering the destination of a transmission, etc. The operation of the control panel 1 is controlled by a control-panel controller 5. A reader 2 for reading image data from an original is connected to a reader controller 6 for controlling the operation of the reader 2. A printer 3 such as a laser-beam printer forms a visible image on recording paper based upon the received image or an image read in accordance with the copy mode. The printer 3 is connected to a printer controller 8 which controls the operation of the printer.

A memory device 4 has a non-volatile memory such as a hard disk for storing an image to be transmitted or an image that has been received. The memory device 4 is connected to a memory controller 9 which controls the operation of the memory device 4. An OCR recognition unit 7 determines whether image data is that of an OCR sheet by discriminating the image data stored in a buffer memory 11. The buffer memory 11 temporarily stores the aforementioned image data. A coder/decoder 12 compresses or decompresses image data. A communication controller 13 controls communication with an external communication medium. A network control unit (hereinafter referred to as an "NCU") controls communication with a network (not shown) connected via a line 20, described below.

Figure 3:
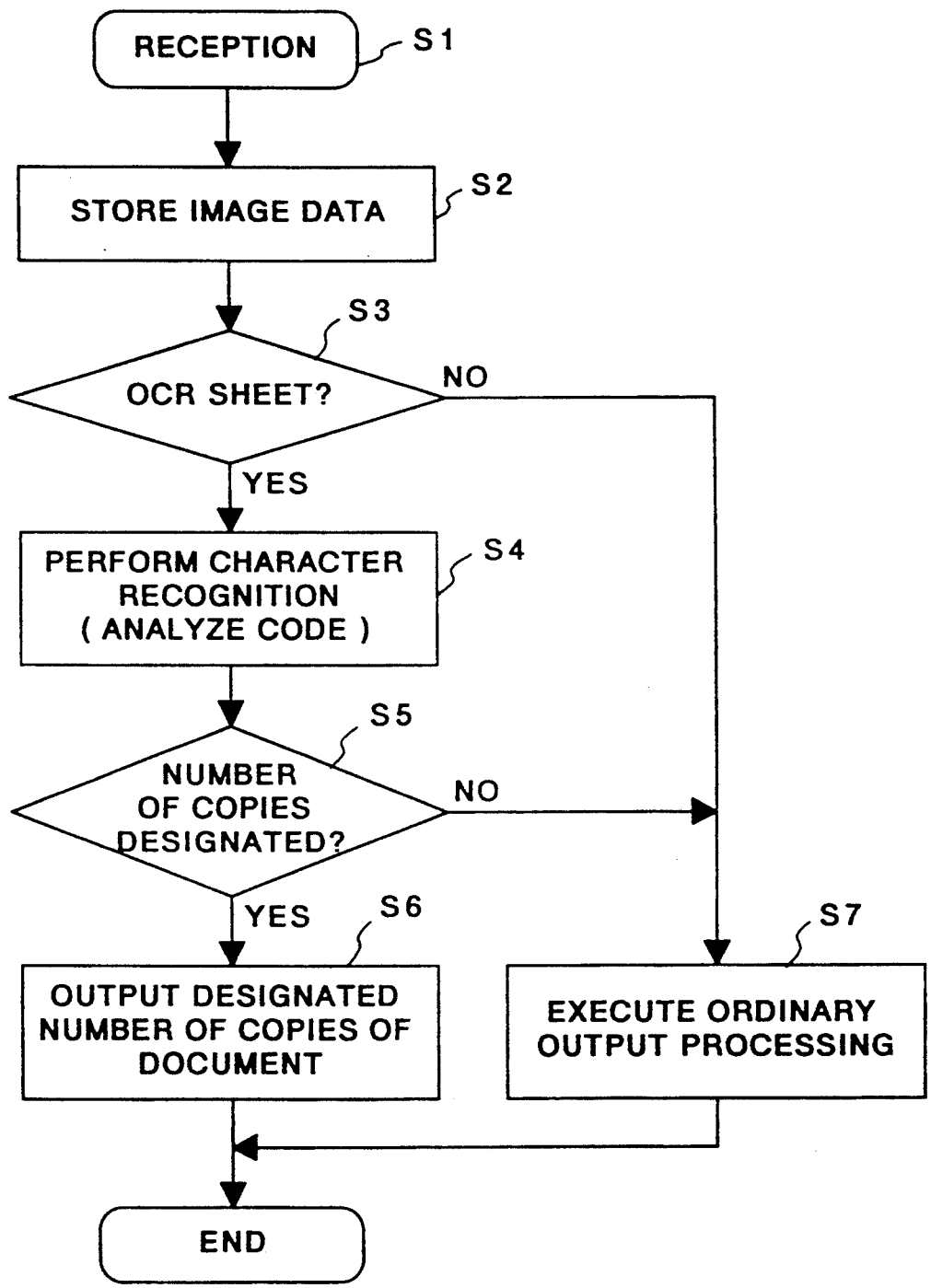
FIG. 3 is a flowchart for describing the principal features of a receiving operation performed by a CPU in the apparatus of the embodiment.

A CPU 10 controls the overall apparatus in accordance with a program stored in a ROM 10a. The ROM 10a stores the aforementioned program, the flowchart of which is illustrated in FIG. 3, described below. A RAM 10b is used as a working area for various programs.

Description of Method for Designating Number of Copies

Figure 2:
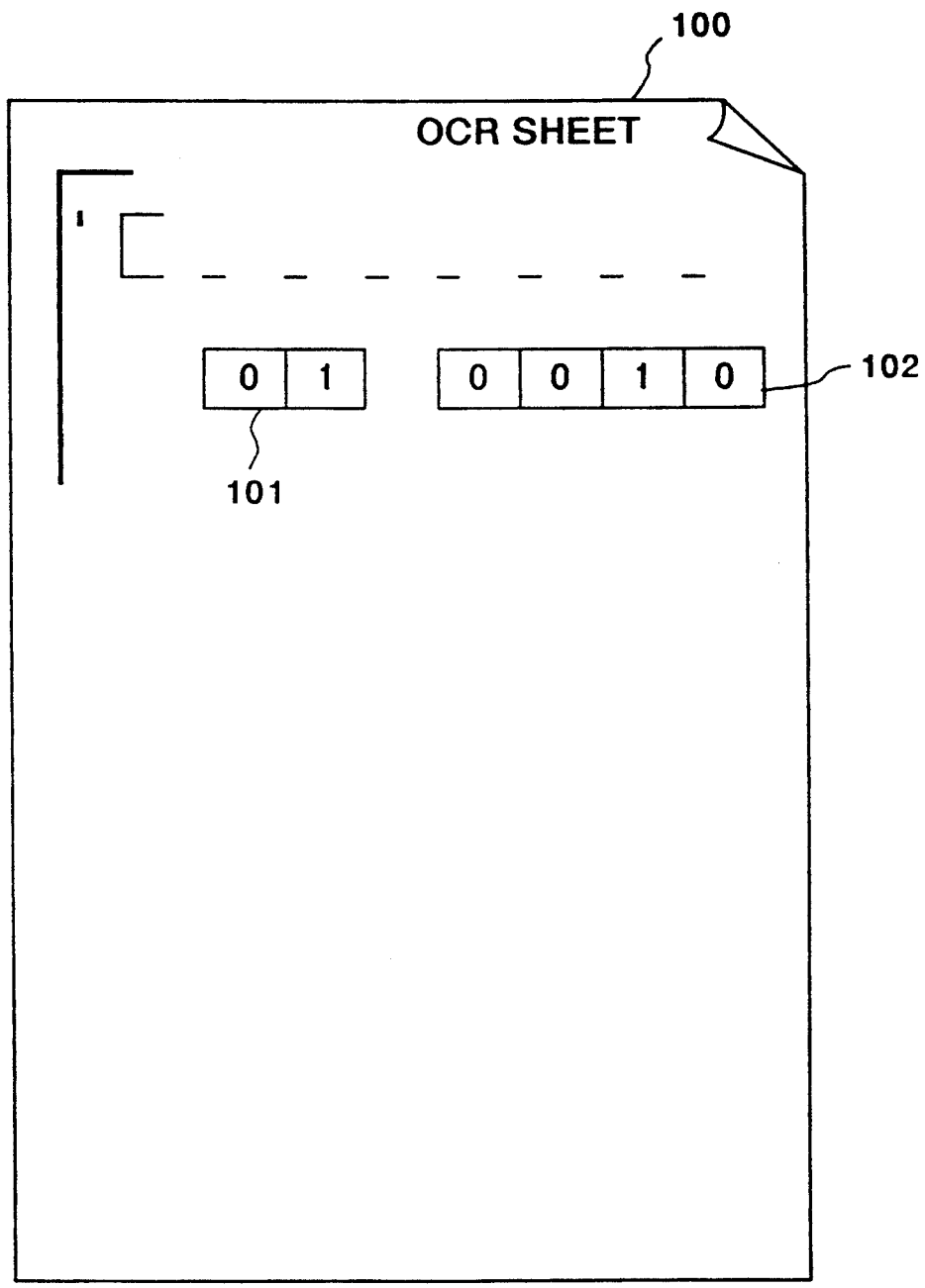
FIG. 2 is a diagram illustrating an example of an OCR sheet used in the present embodiment.

FIG. 2 is a diagram illustrating an example of an OCR sheet 100 used in this embodiment. The OCR sheet 100 includes a use designating section 101 which designates the use of the OCR sheet 100, and a copy-number designating section 102 which designates the number of copies of an output document. The copy-number designating section 102 is a section in which the number of copies transmitted from the sending side to the receiving side is entered. For example, in a case where "01" is entered as a code in the use designating section 101, this indicates that the use is for designating the number of copies. Further, in a case where "0010" is entered as the number of pages in the copy-number designated section 102, this indicates that the number of copies to be made of the document is ten. Thus, the OCR sheet 100 contains the use and the designation (number of copies) corresponding thereto entered by the operator. It should be noted that the facsimile apparatus on the sending side sends the OCR sheet 100 as the first page of the transmitted original.

Description of Operation

FIG. 3 is a flowchart for describing the principal features of the receiving operation performed by the CPU 110 in the apparatus of the embodiment.

It will be assumed here that the facsimile apparatus on the sending side sets and sends the OCR sheet 100 as the first page of a transmission original, and that the desired codes have already been entered in the use designating section 101 and copy-number designating section 102.

When transmission starts and the facsimile apparatus on the receiving side begins to receive image data (a document) at step S1 of the flowchart, the image data is stored in the buffer 11 in page units at step S2. Thereafter, the OCR recognition unit 7 determines at step S3 whether the first page of the received document is the OCR sheet. If the result of the determination is YES, then the OCR recognition unit 7 starts to perform character recognition at step S4 based upon the image of the first page. Character recognition entails recognizing, by a method such as pattern matching, the characters (numerals) in the copy-number designating section 101 described in FIG. 2, and analyzing the use code based upon the row of recognized numerals. If it is decided at step S5 that the result of recognition performed at step S4 indicates a designation of the number of copies (represented by code "01" as described above), then recognition of the characters in the copy-number designating section 102 is carried out at step S6. The numerals (the number of output copies per page of the document) composed of the characters recognized in the copy-number designating section 102 are recognized as being the number of output copies. The printer 3 prints out the received document stored in the buffer 11, with the number of output copies being that recognized. One method of accomplishing this is to use the analyzed number of output copies as a parameter indicative of a number of copies. Ordinary printers usually possess such a parameter. More specifically, when the CPU 10 ascertains the number of output copies, it sets this number as the number of copies to be made by the printer per page of the document.

If the OCR sheet is not discriminated at step S3, ordinary output processing is executed at step S7, after which processing is terminated. Similarly, if the copy-number designation is not discriminated at step S5, ordinary output processing is executed at step S7, after which processing is terminated. An example of such ordinary output processing is for the printer to print out only one copy of each page of the document.

The present invention is applicable both to a case in which print-out is performed successively at the same time that a transmission is made from the sending side to the receiving side, and a case in which print-out is performed after one communicated document has been stored on the receiving side. The embodiment described above is covered by the latter case, in which the OCR sheet need not always be set as the beginning page. If an arrangement is adopted in which the receiving side recognizes whether the final page is the OCR page, then it will suffice if the sending side employs the last page of the transmission document as the OCR sheet.

Thus, in accordance with the present embodiment as described above, the information on the OCR sheet indicating the number of copies is read, and the number of output copies is controlled in accordance with the read information, thereby making it possible for the sending side to designate the number of output copies on the receiving side even if the sending side does not possess a function for designating the number of copies.

In the embodiment described above, the number of copies designated relates to one communicated document as a whole. However, the invention is not limited to the foregoing embodiment, for it is possible to adopt an arrangement in which the OCR sheet is further provided with a section in which an additional item of several digits can be entered. For example, one or a plurality of page numbers can be written in as the additional digits and a plurality of copies of each of the written page number can be outputted as designated pages.

Further, in the above-described embodiment, the use designating section and the copy-number designating section on the OCR sheet are arranged on one line. However, this does not impose a limitation upon the invention, for the copy-number designating section can be disposed below the use designating section, and any additional items can be listed in separate rows.

Further, though numerals are entered in the use designating section and copy-number designating section in the foregoing embodiment, the invention is not limited to such an arrangement. In consideration of the additional items mentioned above, letters of the alphabet can be entered instead of numerals, and whether use or number of copies is designated can be recognized from the meaning of the alphabetic characters.

Further, in the foregoing embodiment, information is entered in the use designating section and copy-number designating section in the form of numerals. However, this does not impose a limitation upon the invention. The content of the use designating section can be entered using characters such as the letters of the alphabet or Chinese characters. In other words, the content can be entered using the characters that are understood by both the sending and receiving sides. By arranging it so that the usable characters are fully recognizable by the OCR recognition unit on the receiving side, functions the same as those of the foregoing embodiment can be obtained.

Figure 4:
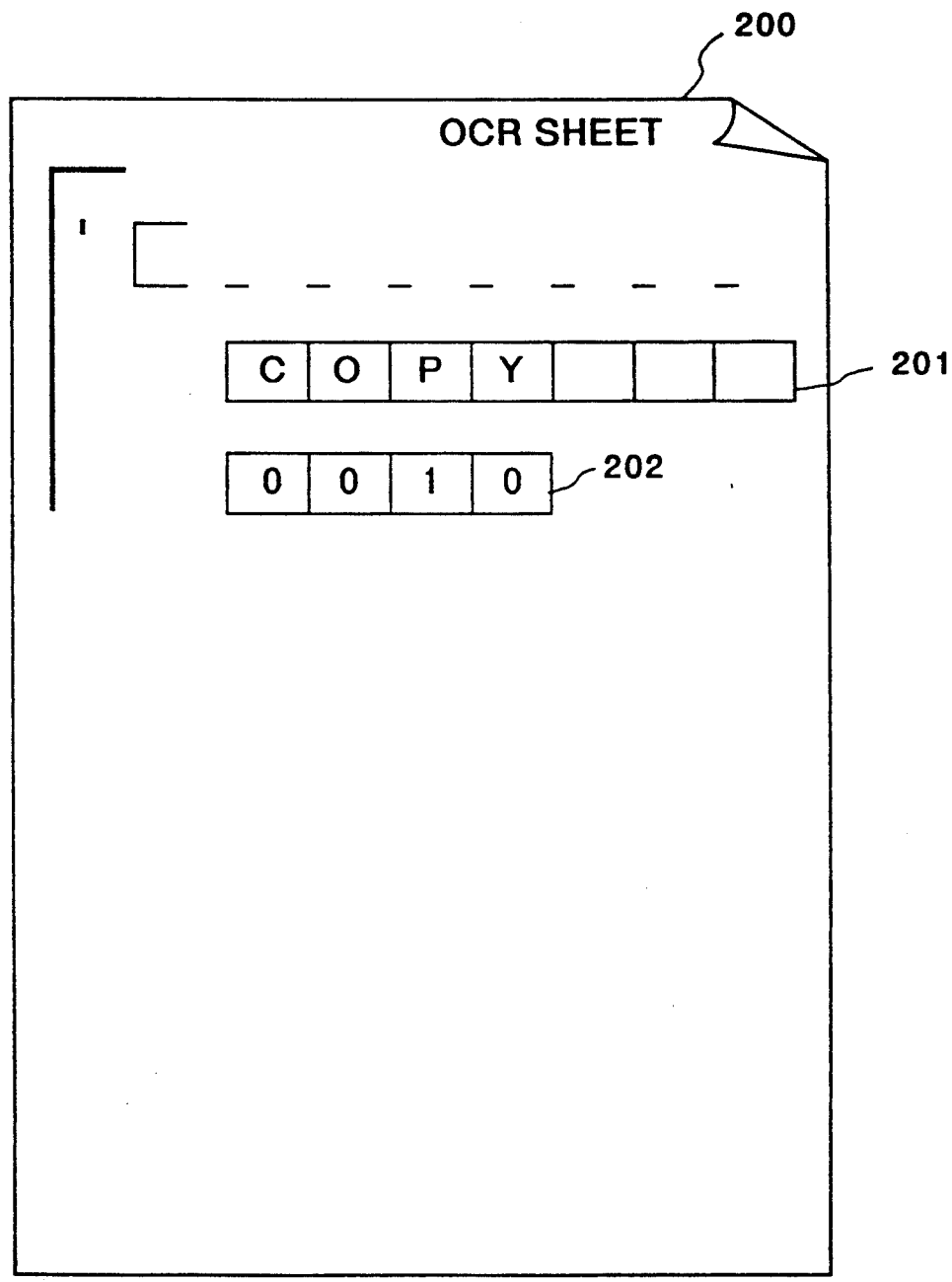
FIG. 4 is a diagram illustrating a first modification of the embodiment.

FIG. 4 is a diagram illustrating a first modification based upon the foregoing description. As shown in FIG. 4, an OCR sheet 200 is provided with a use designating section 201 and a copy-number designating section 202 in two separate rows, and is it so arranged that a word such as "COPY", which indicates that a number of copies are to be made, will fit into the use-designating section 201. FIG. 4 is an example in which the copying of a document is designated as the use and "10" is designated as the number of copies. Of course, it can be so arranged that use is capable of being recognized in a form in which the word indicating the use is abbreviated. In another option, use can be recognized on the receiving side even if the information entered in the use designating section is a word or numeral.

Described next will be a method of analysis on the receiving side for a case where a word has been entered in the use designating section.

FIG. 5 is a table showing the principal feature of a second modification of the foregoing embodiment. It will suffice if the table shown in FIG. 5 is stored in either the ROM 10a or RAM 10b described in FIG. 1. Here a word entered in the use-designating section is analyzed upon being converted into the code described in the foregoing embodiment. For example, "COPY" is converted into the code "01", after which it is analyzed to mean the designation of a number of copies. Further, if "COPY(i)" is the information in the use designating section, it will suffice to convert this into the code "02", after which it is analyzed to mean the designation of the number of copies solely of page i. Thus, it will suffice to furnish a table as a ROM or RAM in such a manner that a character string can be analyzed upon conclusion of character recognition on the receiving side.

Furthermore, though the printer 3 is a laser-beam printer in the foregoing embodiment, it is permissible to use other types of printers, such as printers of the bubble-jet type, thermosensitive type, thermal-transfer type, dot-impact type and ink-jet type.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus comprising:
    receiving means for receiving image data;
    recognizing means for recognizing character information of an optical character reader sheet disposed within the received image data, after discriminating whether or not the received image data contains an optical character reader sheet;
    recording means for recording the received image data; and
    control means for controlling the printing of the received image data in accordance with the result of the recognition by said recognizing means,
    wherein said control means controls the printing of the received image data by printing one copy of the received image data when the optical character reader sheet is not included in the received image data,
    and wherein said control means controls the printing of the received image data by printing a number of copies determined in accordance with the result of recognition by said recognizing means, without the image data of the optical character reader sheet, when the optical character reader sheet is included in the received image data.

2. The apparatus according to claim 1, wherein the character information of the optical character reader sheet indicates the number of output copies by a code.

3. The apparatus according to claim 2, wherein the code indicates a number of output copies of the received document information.

4. The apparatus according to claim 3, wherein the code includes a code for outputting a plurality of copies of a designated page only.

5. The apparatus according to claim 1, wherein the character information of the optical character reader sheet indicates the number of output copies by a character string.

6. The apparatus according to claim 5, wherein the character string indicates a number of output copies of the receiving document information.

7. The apparatus according to claim 6, wherein the character string includes a code for outputting a plurality of copies of a designated page only.

8. An image output method for outputting received image data, comprising the steps of:
    receiving image data;
    discriminating whether or not the received image data contains an optical character reader sheet;
    recognizing the character information disposed on said optical character reader sheet;
    outputting the received image data once when the optical character reader sheet is not included in the received image data; and
    determining a number of copies to be output in accordance with the result of recognition in said recognizing step and outputting as many copies of the image data as the determined number, without the image data of the optical character reader sheet, when the optical character reader sheet is included in the received image data.

* * * * *

UNITED STATES PATENT AND TRADEMARK OFFICE
CERTIFICATE OF CORRECTION

PATENT NO. : 5,224,180
DATED : June 29, 1993
INVENTOR(S) : YOSHIBA TADOKORO

It is certified that error appears in the above-identified patent and that said Letters Patent is hereby corrected as shown below:

On title page, item [54]

"FACSIMILE APPARATUS AND THE METHOD" should read
--FACSIMILE APPARATUS AND METHOD--.

COLUMN 1

Line 2, "FACSIMILE APPARATUS AND THE METHOD" should read
--FACSIMILE APPARATUS AND METHOD--.
Line 22, "only only" should read --only--.
Line 63, "obtain" should read --obtained--.

COLUMN 4

Line 35, "number" should read --numbers--.

COLUMN 6

Line 31, "receiving" should read --received--.

Signed and Sealed this

Twelfth Day of April, 1994

Attest:

BRUCE LEHMAN

Attesting Officer

Commissioner of Patents and Trademarks